No. 634,113. Patented Oct. 3, 1899.
A. KENNEY.
WATER FILTER.
(Application filed Feb. 16, 1899.)
(No Model.)

Witnesses,
G. H. Amrose
H. F. Ascheck

Inventor,
Augustine Kenney
By Dewey Strong & Co.
Attys

THE NORRIS PETERS CO., PHOTO-LITHO., WASHINGTON, D. C.

UNITED STATES PATENT OFFICE.

AUGUSTINE KENNEY, OF SAN FRANCISCO, CALIFORNIA, ASSIGNOR TO HERMANN ZADIG, R. C. REED, AND WILLIAM BRADY, OF SAME PLACE.

WATER-FILTER.

SPECIFICATION forming part of Letters Patent No. 634,113, dated October 3, 1899.

Application filed February 16, 1899. Serial No. 705,642. (No model.)

*To all whom it may concern:*

Be it known that I, AUGUSTINE KENNEY, a citizen of the United States, residing in the city and county of San Francisco, State of California, have invented an Improvement in Water-Filters; and I hereby declare the following to be a full, clear, and exact description of the same.

My invention relates to an improved automatically-cleaning filter for water and the like.

It consists, essentially, of a filtering-chamber, an exterior containing-chamber into which water is admitted to pass through the sides of the filter to the interior, means for discharging the water from the interior of the filter, and a revoluble jet mechanism by which the exterior of the filter may be cleansed at will.

It also comprises details of construction, which will be more fully explained by reference to the accompanying drawings, in which—

Figure 1:
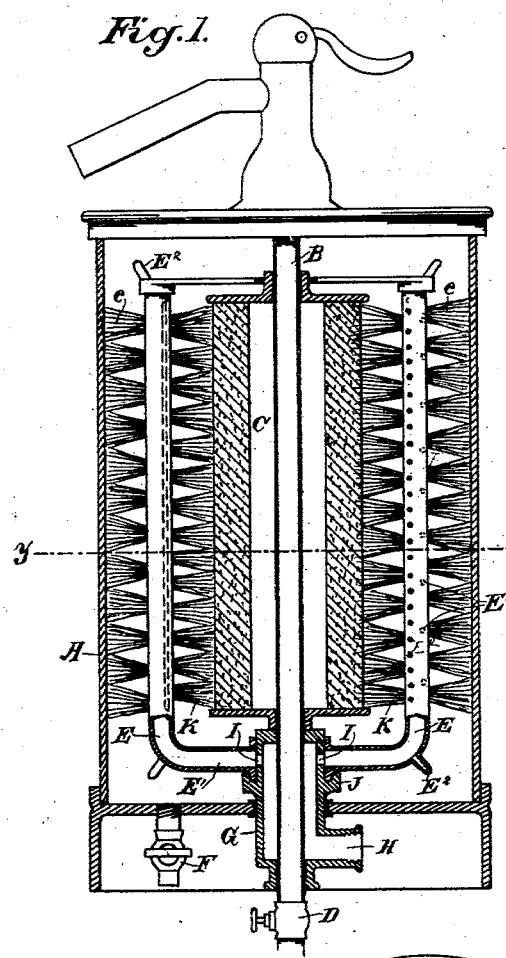
Figure 3:
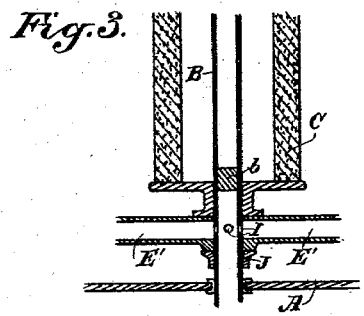
Figure 4:
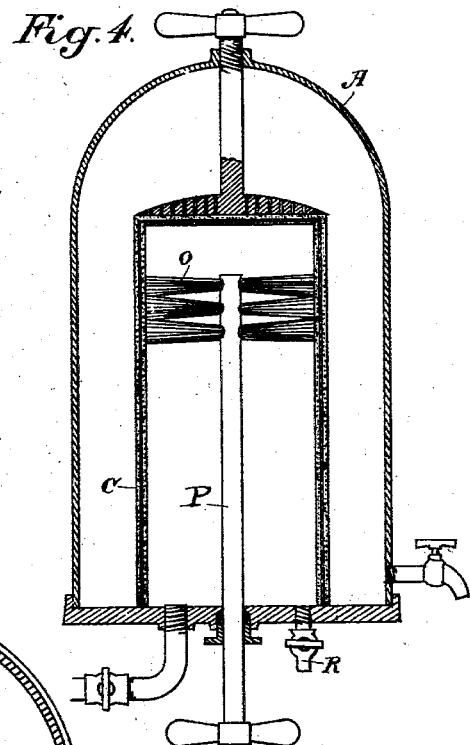
Figure 2:
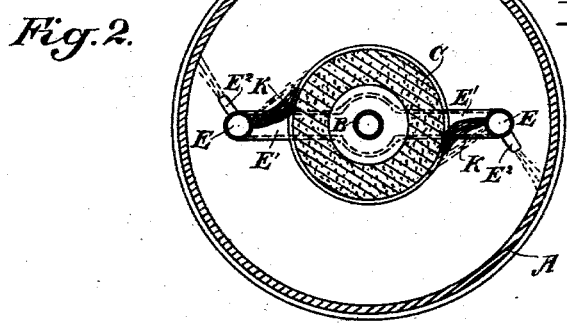

Figure 1 is a vertical section through the filter. Fig. 2 is a horizontal section on line $y\ y$ of Fig. 1. Fig. 3 is a modification of the inlet. Fig. 4 shows a means for cleaning the interior of the filter.

A is a chamber or casing made of any suitable or desired material and of a size convenient for the amount of water to be filtered. Centrally through this casing passes a pipe B, which fits into the heads of the casing with tight joint. Surrounding this pipe within the casing is a filter-chamber C, which may be made of stone or any suitable porous filtering substance which may be used for the purpose. Water being admitted into the exterior chamber A under pressure passes through the sides of the filter C, and the interior tube B being perforated the water thus admitted to the filter is free to pass into the pipe through these perforations and may be drawn either by means of a suitable cock, faucet, or other device at the top or by a cock or faucet D at the bottom.

In order to cleanse the outer surface of the filter when it becomes coated with deposited material, I employ jet-tubes E, which extend upward upon each side of the filter and essentially parallel therewith. These jet-tubes have perforations $E^2$ made in them at such an angle that when water is admitted under pressure its escape through these jet-openings will cause the tubes to move around their axial support by the reactionary force of the jets of water discharged therefrom. At the same time these jets are delivered with force against the periphery of the filter C, and thus revolving around it and continually discharging water against it with considerable force any sediment or deposit upon the exterior of the filter will be cleansed away, aided by the brush K.

It will be understood that while the filtering is taking place the chamber A will be full of water under sufficient pressure to force its way through the sides of the filter; but when the filter is to be cleansed a stop-cock F is opened, which allows the water to be discharged from the vessel A, which when empty offers no impediment to the revolution of the jet-tubes E and the action of the water upon the surface of the filter. At the bottom the jet-tubes E are bent at right angles, as shown at E', and connect with a central hub surrounding the pipe B.

As shown in Fig. 1, the hub carrying the arms E' is turnable upon a tubular casing G, through the center of which the pipe B passes, the casing being of sufficiently larger diameter to allow water to be introduced into it under pressure through the passage H. Within the hub G the casing is pierced with a sufficient number of openings I, so that water may pass out of the casing into the arms E E', and it is delivered through the perforations in the arms E into the chamber A, as previously described. When the filtering is going on, the cock F being closed the chamber A will fill with water and the water will simply flow through these pipes E into the chamber, and thence by reason of the pressure will pass through the filter and may be drawn whenever desired through the cock D. When the cleaning takes place, the cock F being opened the chamber A will be empty and the reactionary force of the water will then rotate the pipes E, and, as before described, cleanse the filter. In conjunction with these jets I have also shown brushes $e$, carried by the arms E, to be used, if desired.

The hub $e$ has an extension at the bottom which fits into an annular step J, surrounding the hub G, and this forms a bearing upon which the arms are supported and rotate.

If it is desired to discharge the water upwardly from the filter, the pipe B may have a plug $b$ fixed in it at a point near the bottom of the filter and above the hub G and the arms E', as shown in Fig. 2. This plug prevents water from passing directly up through the pipe, and the holes I, which are made in that part of the pipe coincident with the arms E', allow the water to flow into the arms, as previously described, the action being essentially the same as in a former construction.

The interior of the filter may be cleaned by means of brushes O, projecting radially from a shaft P, which extends up axially through the filter and is both slidable and turnable therein, so that all parts can be reached by the brushes.

R is a sediment-discharge cock.

Having thus described my invention, what I claim as new, and desire to secure by Letters Patent, is—

1. The combination in a filter of an exterior casing, a vertically-disposed centrally-fixed pipe, a filter-chamber fixed around said pipe within the exterior casing, means for admitting water into the casing consisting of perforated revoluble arms extending upon each side of the filter and adapted to discharge water diagonally against the surface of the filter, a supply-pipe connecting with said revoluble arms and perforations made in the pipe which is interior to the filter.

2. The combination in a filter of an exterior containing-casing, a centrally-disposed vertical discharge-pipe fixed within the casing and extending through it having perforations made in that portion within the casing, a filter device fixed to the pipe and inclosing the perforated portion thereof, and a discharge-cock whereby water may be drawn from the interior of the filter, a supply-pipe of larger diameter surrounding said discharge-pipe below the filter having an annular step around the exterior, a hub turnable in said step having arms radiating horizontally therefrom and perforations in the pipe from which water may be admitted into said arms, and vertical extensions of said arms having diagonal holes made in their inner sides whereby jets of water are thrown against the filter and the arms are rotated about the filter during the operation.

In witness whereof I have hereunto set my hand.

AUGUSTINE KENNEY.

Witnesses:
S. H. NOURSE,
JESSIE C. BRODIE.